(12) United States Patent
Long et al.

(10) Patent No.: US 8,683,153 B1
(45) Date of Patent: Mar. 25, 2014

(54) ITERATING FOR DEDUPLICATION

(75) Inventors: Matthew Long, Uxbridge, MA (US);
Xiangping Chen, Shrewsbury, MA (US); Miles A de Forest, Bahama, NC (US)

(73) Assignee: EMC Corporation, Hopkinton, MA (US)

( * ) Notice: Subject to any disclaimer, the term of this patent is extended or adjusted under 35 U.S.C. 154(b) by 633 days.

(21) Appl. No.: 12/893,854

(22) Filed: Sep. 29, 2010

(51) Int. Cl.
*G06F 12/00* (2006.01)

(52) U.S. Cl.
USPC .................. 711/162; 711/E12.069; 711/112

(58) Field of Classification Search
USPC ........................................................ 711/173
See application file for complete search history.

(56) References Cited

U.S. PATENT DOCUMENTS 8,108,446 B1 * 1/2012 Christiaens .................... 707/816
8,156,306 B1 * 4/2012 Raizen et al. .................. 711/202

* cited by examiner

*Primary Examiner* — Reginald Bragdon
*Assistant Examiner* — Hamdy S Ahmed
(74) *Attorney, Agent, or Firm* — Krishnendu Gupta; Deepika Bhayana

(57) ABSTRACT

A method is used in iterating for deduplication. A collection of data is selected from a set of storage extents. The collection of data is comprised of respective subset of the contents of each storage extent of the set of storage extents. A deduplicating technique is applied to the collection of data.

17 Claims, 8 Drawing Sheets ly, in many conventional cases, when duplicates are likely to be found at similar offsets within multiple storage extents, these duplicates are not found until each storage extent is completely iterated through.

ITERATING FOR DEDUPLICATION

BACKGROUND

1. Technical Field

This application relates to iterating for deduplication.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

SUMMARY OF THE INVENTION

A method is used in iterating for deduplication. A collection of data is selected from a set of storage extents. The collection of data is comprised of respective subset of the contents of each storage extent of the set of storage extents. A deduplicating technique is applied to the collection of data.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
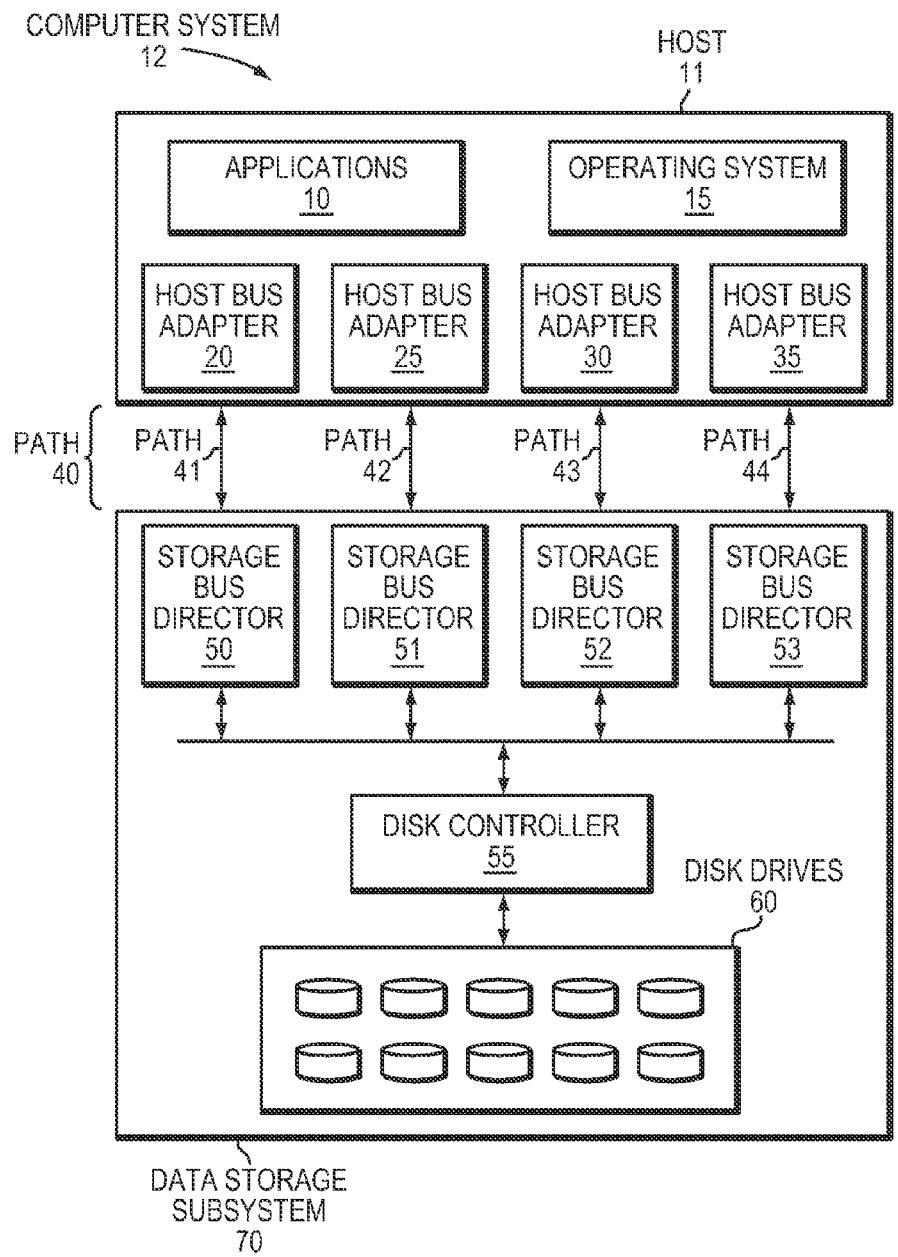
FIG. 1 is an example of an embodiment of a computer system that may utilize the techniques described herein.

Described below is a technique for use in iterating for deduplication (i.e., data deduplication), which technique may be used to provide, among other things, selecting a collection of data based on an offset from a set of storage extents and iterating over the collection of data that is comprised of respective subsets of the contents of the storage extents.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. The size of this index table determines a window of deduplication opportunity. The larger the index table, the more blocks can be checked for duplicates, and thus the larger the opportunity for deduplication. However, a large index table consumes more storage resources and memory of the storage system. Therefore, given a limited amount of memory and/or storage resources, not every block of the storage system can be selected and information for that block stored in an index table. A goal is to select blocks that have a high probability of being deduplicated and find those blocks earlier using the least or a reduced amount of time, memory, and storage resources.

In at least one storage system implementation as described below, iterating for deduplication includes iterating over set of data blocks located in multiple storage extents in parallel, such that duplicates are found much earlier as there are many cases where duplicates are likely to be found at a similar offset in multiple storage extents.

Conventionally, data deduplication for feature software requires that data blocks in a storage extent be iterated from beginning to end. A set of storage extents that are deduplicated together form a deduplication domain. As a result, in a conventional system, each storage extent in the deduplication domain is iterated through completely followed by the next storage extent (i.e., iteration through a first storage extent is completed prior to commencement of iteration through a second storage extent). During this process, an index table of unique digests is created from the blocks that are iterated through. Thus, conventionally in such a case, in order for the system to perform data deduplication across multiple storage extents within a deduplication domain, the digest index table must be large enough to index all the unique blocks within a storage extent plus additional blocks in the next storage extent. Thus, a large digest index table in such conventional system consumes a large amount of storage resources. Further, iterating over a large sets of data takes more time, thus increasing the possibility that by the time possible duplicate data is found, original data might have become stale or changed. Therefore, in such a conventional system, to find duplicate data across multiple storage extents, each storage extent must be iterated from start to end irrespective of placement of duplicate data within each storage extent. Additionally, in many conventional cases, when duplicates are likely to be found at similar offsets within multiple storage extents, these duplicates are not found until each storage extent is completely iterated through.

By contrast, in at least some implementations in accordance with the technique as described herein, the use of the iterating for deduplication technique can provide one or more of the following advantages: lowering costs by improving deduplication efficiency, improving memory utilization by reducing the index table size, and reducing the amount of storage required for data deduplication by finding the duplicates much earlier in the iteration process and thus greatly reducing the size of the index table without substantially affecting deduplication efficiency. In many cases the index table fits entirely in system memory thus substantially improving index table performance. Additionally, in at least some cases, iterating through a small set of all storage extents in parallel can instantly start yielding high deduplication ratios.

In some embodiments, the current technique can be used to improve deduplication efficiency in a case in which a storage extent contains a virtual machine image. Typically, many other virtual machine images are cloned from this one image, each image residing on its own storage extent, and as the virtual machines are used over time to execute user operations, the images diverge but the vast majority of data remains the same among the images. Because these images were initially clones of each other, blocks at identical offsets in different extents are likely to be duplicates.

Further, in a case in which backup copies of some data are created at different points in time, each backup copy residing on its own storage extent, typically any data that has not changed between backup copies is a duplicate of data from previous backup copies. Thus, it is highly likely that the blocks at identical or very similar offsets contain duplicate data. In both the above mentioned cases, iterating in parallel over data blocks that reside at similar or the same offsets within each storage extent helps achieve detection of duplicate blocks faster in terms yielding high duplication ratios.

Referring to FIG. 1, shown is an example of an embodiment of a computer system that may be used in connection with performing the techniques described herein. A computer system may include multiple hosts and multiple data storage systems in such a way that each host may access data on each of data storage systems. For simplicity, however, FIG. 1 illustrates a computer system 12 that includes a single host 11 and a single data storage system 70. Applications 10 running on operating system 15 of host 11 may access data in data storage system 70 via I/O driver and host bus adapters 20, 25, 30, and 35. Host 11 can be, for example, a server, a personal computer, or any other device capable of initiating read and write requests to data storage system 70. Data storage system 70 can be a single physical data storage device or a data storage system comprising multiple physical data storage devices including an enterprise storage system. In computer system, consistent with the principles of the invention, there may be a plurality of data storage systems 70 accessible by host 11 and each data storage system may be unique.

Host 11 has multiple paths 40 for sending I/O requests to data storage system 70. Typically, there are at least two paths from a host to a data storage system. FIG. 1 shows four paths from host 11 to data storage system 70: path 41, path 42, path 43, and path 44. Each of the paths 40 can be any of a number of different types of communication links that allow data to be passed between data storage system 70 and host 11. Each of the host bus adapters 20, 25, 30, and 35 would be adapted to communicate using an appropriate protocol via the paths 40 with the storage bus directors 50, 51, 52 and 53. For example, path 40 can be implemented as a SCSI bus with host bus adapters 20 and storage bus director 50 each being a SCSI driver. Alternatively, path 40 between the host 11 and the data storage subsystem 70 may be a Fibre Channel fabric. Moreover, a path 40 may include multiple communication path types and may be part of a communication network.

In this embodiment of the computer system 12, the host 11 may access the data storage systems 70, for example, in performing input/output (I/O) operations, data requests, and other operations. The host 11 may perform different types of data operations in accordance with different types of tasks. The communication medium, path 40, may be any one or more of a variety of networks or other type of communication connections as known to those skilled in the art. Each of the paths 41-44 may be a network connection, bus, and/or other type of data link, such as a hardwire or other connections known in the art. The processors included in the host computer systems 11 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 70 are described herein in more detail, and may vary with each particular embodiment. The host 11 and data storage system 70 may all be located at the same physical site, or, alternatively, may also be located in different physical locations.

Storage bus directors 50, 51, 52 and 53 further communicates with the disk controller 55 to access data stored on the disk drives 60. the disk controller 55 may be configured to perform data storage operations on behalf of the host 11. Host system 11 may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single data storage system may be accessed by multiple hosts allowing the hosts to share the data residing therein. An LV or LUN (logical unit number) may be used to refer to the foregoing logically defined devices or volumes.

Figure 2:
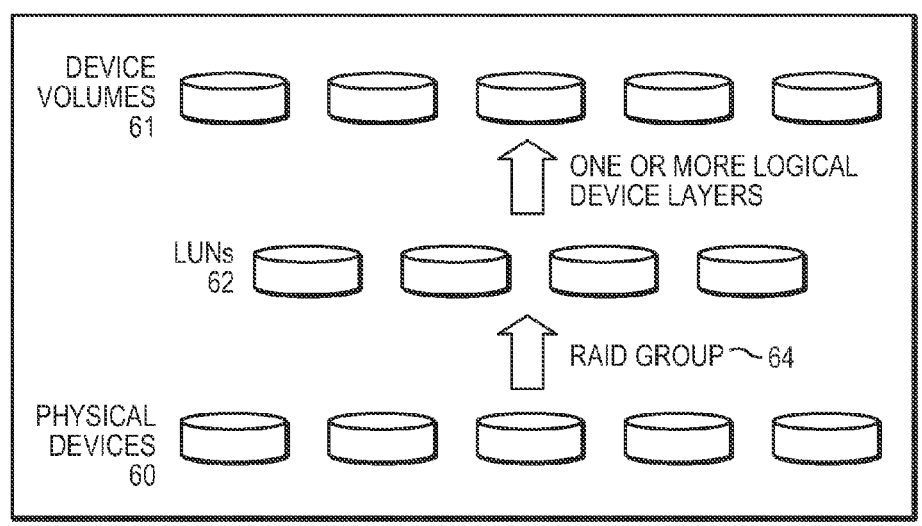
FIG. 2 is an example illustrating storage device layout.

FIG. 2 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

In another embodiment, the data storage subsystem 70 may include one or more data storage systems such as one or more of the data storage systems offered by EMC Corporation of Hopkinton, Mass. The data storage system may also include one or more data storage devices, such as disks. One or more data storage subsystems may be manufactured by one or more different vendors. Each of the data storage systems may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 70. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 70 of FIG. 1 is implemented using one or more data storage systems, each of the data storage systems may include code thereon for performing the techniques as described herein. In following paragraphs, reference may be made to a particular embodiment such as, for example, an embodiment in which element 70 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

As will be appreciated by those skilled in the art, the data storage system 70 may also include other components than as described for purposes of illustrating the techniques herein.

The embodiment of FIG. 1 benefits from iterating over various storage extents in accordance with the current technique in order to improve the performance of a data deduplication process within the embodiment. In particular, the data deduplication process may benefit from iterating over multiple storage extents in parallel in order to improve deduplication index efficiency. In at least some embodiments based on the current technique, a collection of data blocks from a set of storage extents can be selected in such a way that data blocks of the storage extents are iterated through effectively in parallel to better manage and optimize the data deduplication. Selecting the collection of data blocks may be based on an offset at which each data block resides within a storage extent. The offset may be determined by a user or an application running on a host system 11 or selected by the data storage system 70. In an alternative embodiment, the current technique enables the system to dynamically change the offset based on the results of applying data deduplication process to set of blocks iterated using prior iterations.

Figure 3:
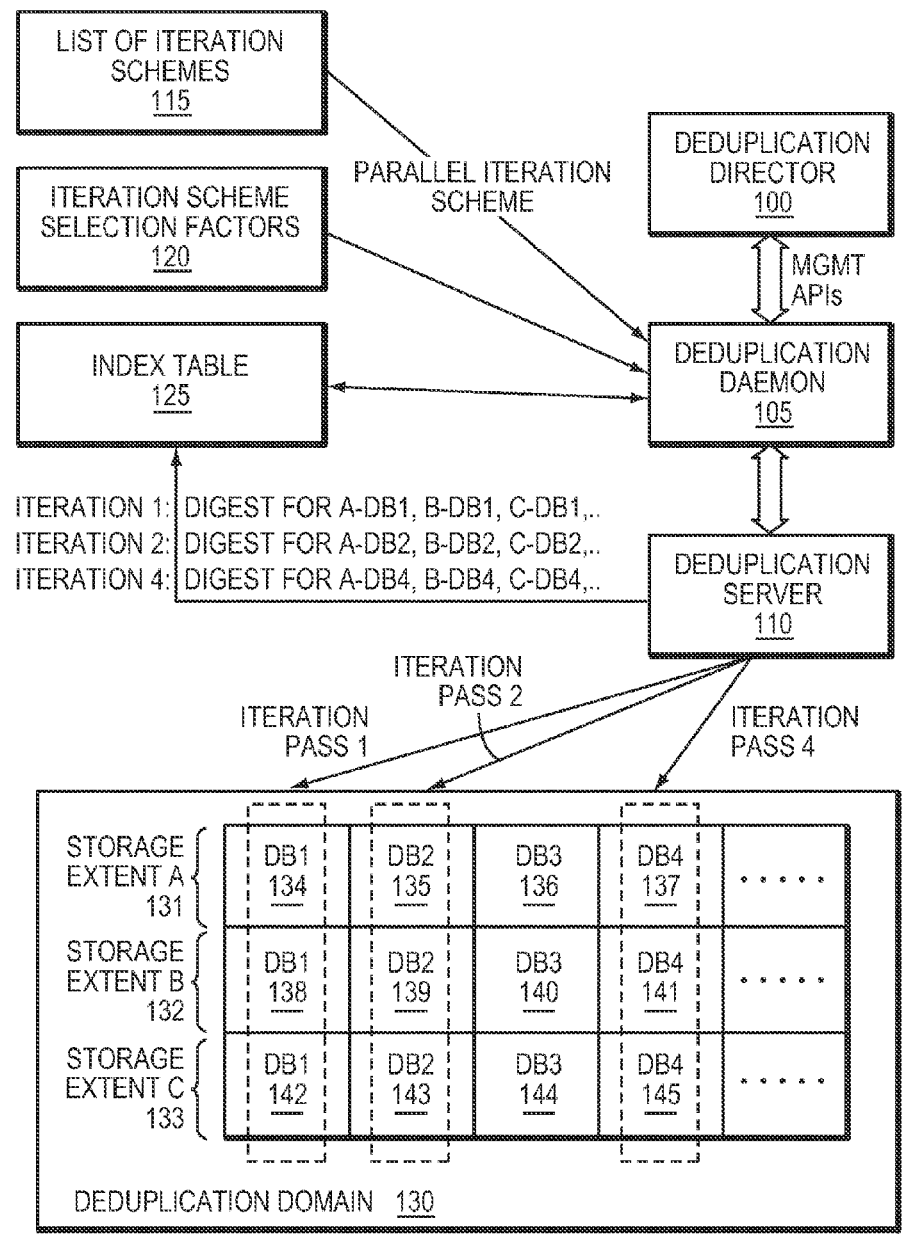
FIGS. 3 and 4 are diagrams illustrating in more detail components that may be used in connection with techniques herein.

Referring to FIG. 3, shown is a more detailed representation of components that may be included in an embodiment using the techniques herein. In a deduplication domain, each storage extent contains a range of data blocks. For example, in FIG. 3, storage extent A 131, storage extent B 132 and storage extent C 133 are part of the deduplication domain 130. Within a data storage system 70, there may be multiple deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 3, storage extent A 131 includes data blocks 134-137, storage extent B 132 includes data blocks 138-141 and storage extent C 131 includes data blocks 142-145 and other data blocks (not shown).

In at least one embodiment of the current technique, deduplication server 110 is a component that provides services to deduplication daemon 105 to iterate over sets of data in a deduplication domain 130. Within a data storage system 70, there may be multiple deduplication daemons. Deduplication server 110 also computes digests and remaps blocks after the deduplication technique is applied to remove duplicate blocks of data. Deduplication director 100 monitors deduplication configuration and coordinates processing across multiple deduplication domains by starting and stopping deduplication daemons for each deduplication domain. Deduplication director 100 also manages the LUNs that store deduplication databases. Deduplication director 100 also maintains a throttling policy and provides an interface to services that set policy for memory use.

Deduplication daemon 105 in FIG. 3 maintains a deduplication database for a deduplication domain 130. Deduplication daemon 105 communicates with the deduplication server 110 to iterate through deduplication domain 130 and computes digests for the data blocks that are iterated through. A digest is created for each chunk of data that is iterated. Deduplication daemon 105 detects potential duplicate copies of data during the iteration and issues a request to the deduplication server 110 to deduplicate the data. The deduplication database is stored on one of the storage extents that includes one or more LUNs. Deduplication daemon 105 also maintains an index table 125 on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 125. The more entries in the index table, the more likely that duplicate blocks will be detected during the iteration. To accommodate more entries, the index table requires more memory and storage resources. Additionally, if the amount of storage used by the user is in terabytes, it can take days to iterate over the chunks of data for such a large address space of the storage. Thus, the index table typically contains an incomplete set of entries and does not include digests for all of the data inside all of the storage in the deduplication domain. Deduplication daemon 105 uses a set of factors 120 that guides daemon 105 in selecting a specific iteration scheme from a list of iteration schemes 115 maintained by a computer system. In at least one embodiment, use of the current technique enables selecting a parallel iteration scheme from the list of iteration schemes, such that iteration occurs in parallel over a collection of blocks within a set of storage extents that have a high probability of being deduplicated. The iteration scheme may be supplied by a user or a system. The parallel iteration scheme in accordance with the current technique further includes determining an offset at which data blocks are selected to be included in the collection of data blocks for parallel iteration. The parallel iteration scheme may be supplied to deduplication daemon 105 manually by a user via a tool or automatically during a deduplication process. The parallel iteration scheme may also be supplied by an application running on host or a computer system. Iteration scheme selection factors 120 may include one or more of the following: type of storage media where data is stored, type of data storage system, type of media on which the index table is stored, type of file system and kinds of files stored on those file systems, how fast data is being written to LUNs, prior statistics or history of deduplication efficiency, among other things. For example, in FIG. 3, according to parallel iteration scheme, deduplication server 110 iterates over a collection of data blocks from a set of storage extents (A 131, B 132 and C 133) wherein every data block in the collection is reviewed for deduplication during an iteration pass. For example, iteration pass 1 includes data block DB1 134 from storage extent A 131, data block DB1 138 from storage extent B 132, and data block DB1 142 from storage extent C 133. Iteration pass 2 includes data block DB2 135 from storage extent A 131, data block DB2 139 from storage extent B 132, and data block DB2 143 from storage extent C 133. Iteration pass 4 includes data block DB4 137 from storage extent A 131, data block DB4 141 from storage extent B 132, and data block DB4 145 from storage extent C 133. Deduplication server 110 computes digests for the data blocks in each iteration and sends the digests to deduplication daemon 105 which processes the digests and adds new digests for the data blocks to index table 125 if necessary. The index table includes digests for each data block that is iterated during one or more iteration pass. Thus, digests created during multiple iterations is considered for deduplication and based upon the size of the index table, duplicates are found across multiple storage extents. Fox example, in FIG. 3, if the data stored in data block DB1 134 is same as the data stored in DB4 145 and if the size of the index table is large enough to hold at least twelve entries, the data block DB4 145 will be deduplicated during the iteration pass 4 because the digest created for the data block DB4 145 will match with the digest stored in the index table for the data block DB1 134. Thus, the index table that is small enough to contain just twelve entries can find many duplicates across three storage extents using the parallel iteration scheme.

Figure 4:
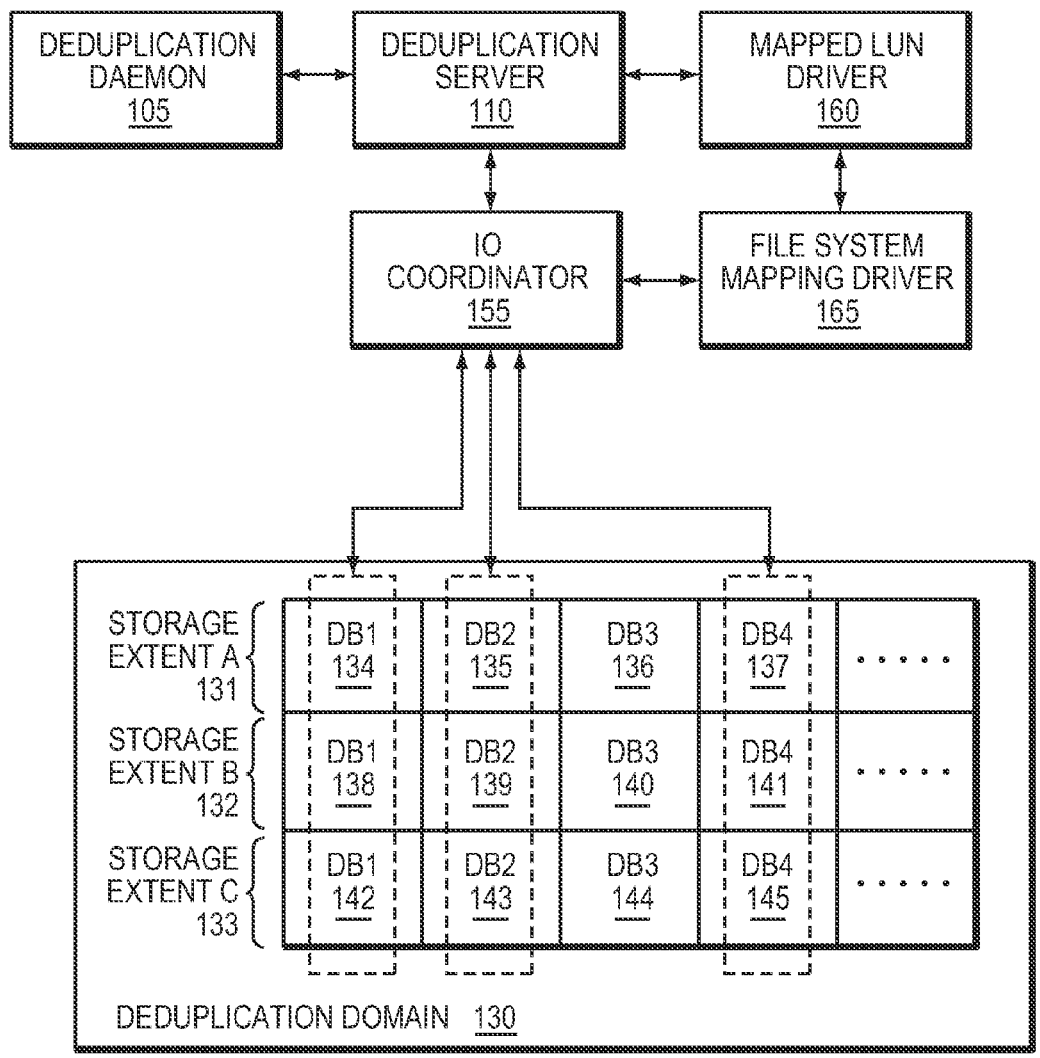

Referring to FIG. 4, shown is a more detailed representation of components that may be included in an embodiment using the techniques herein. During deduplication processing as described herein, deduplication server 110 provides services to deduplication daemon 105 by interacting with Mapped LUN Driver (MLU) 160 and File System Mapping Driver 165 via IO Coordinator 155. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., table 125) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of filesystem mapping driver 165 based on which Mapped LUNs are implemented by Mapped LUN driver 160. A filesystem allows dynamic manipulation of the address maps that connects the MLU's address space to it physical address space. The file system also allows mapping a single block of storage at multiple locations within the filesystem, and allows handling of writes to shared blocks by allocating new storage and updating the shared address mappings.

Mapped LUN Driver 160 presents a deduplication domain 130 as a logical object to deduplication server 110. Mapped LUN Driver 160 also manages the life cycle of files in a filesystem implemented by file system mapping driver 165, and adds LUN semantics to files and manages storage allocations from storage pools for the files. Driver 160 also provides configuration and state information related to storage pools, storage extents, and LUNs in a storage pool to other subsystems such as deduplication director 100. IO Coordinator 155 manages IO operations in conjunction with the file system mapping driver 165. IO Coordinator provides framework for implementing digest and other IO requests issued by the deduplication server 110.

Figure 5:
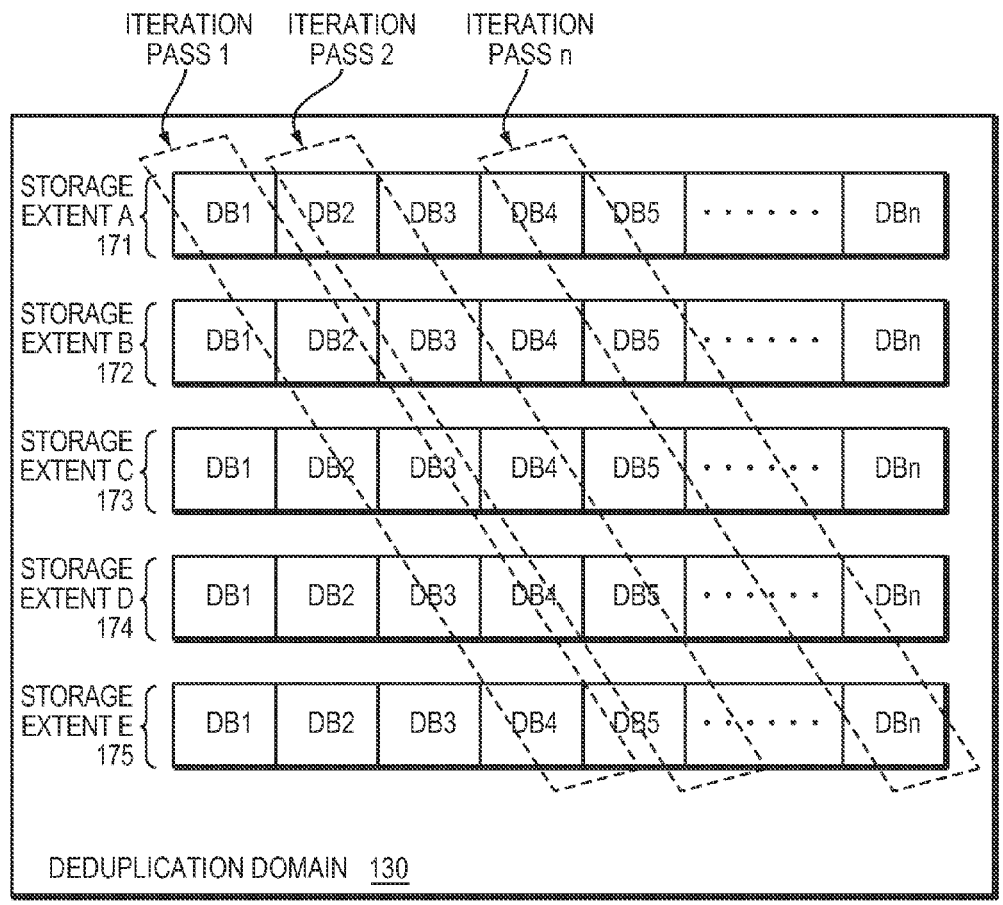
FIG. 5 is an example illustrating an iteration scheme across a set of storage extents.

Referring to FIG. 5, shown is one example of selection of a collection of data blocks that may be included in an embodiment using the techniques herein. A goal of the parallel iteration scheme in accordance with the current technique is to find duplicate blocks faster by iterating through a small range of a set of storage extents instead of iterating each storage extent completely one by one. Depending on the implementation, the offset at which data blocks are selected for iteration from each storage extent can be the same offset within the storage extent, similar offsets within the storage extents or different offsets. For example, in FIG. 5, data blocks are selected from each storage extent wherein the offset is different for each storage extent. Iteration pass 1 includes data block DB1 from storage extent A 171, data block DB2 from storage extent B 172, data block DB3 from storage extent C 173, data block DB4 from storage extent D 174, and data block DB5 from storage extent E 175. Iteration pass 2 includes data block DB2 from storage extent A 171, data block DB3 from storage extent B 172, data block DB4 from storage extent C 173, data block DB5 from storage extent D 174, and data block DB6 from storage extent E 175, and so on.

Figure 6:
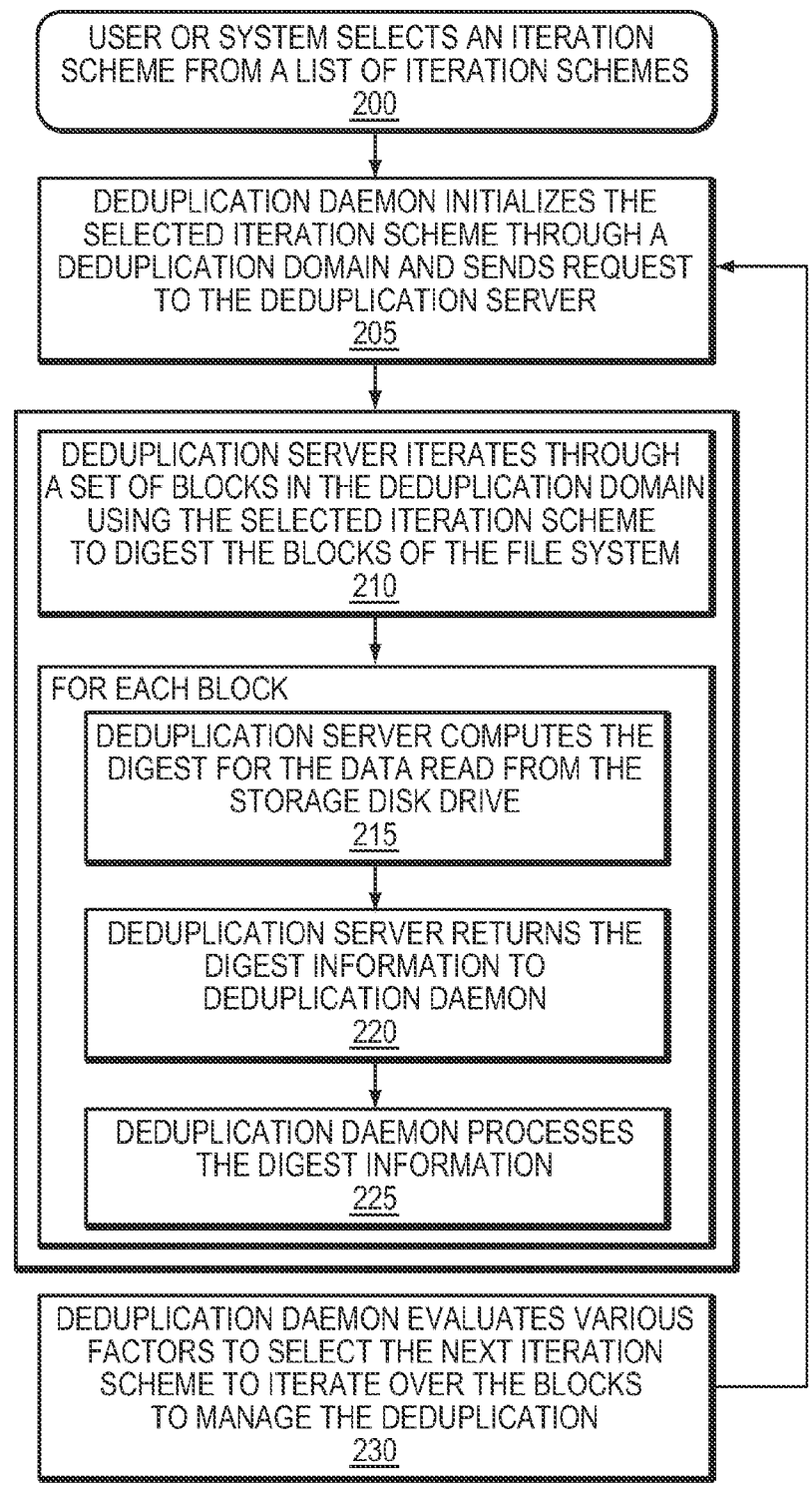
FIGS. 6-8 are flow diagrams illustrating processes that may be used in connection with techniques herein.

Referring to FIG. 6, shown is a flow diagram illustrating a flow of data in the data storage system. A user or a system selects an iteration scheme from a list of iteration schemes 115 (step 200). The selected iteration scheme is supplied to the deduplication daemon 105 that does the initialization for iterating through a deduplication domain 130 and sends the request to the deduplication server 110 (step 205). Based on the selected iteration scheme, deduplication server 110 iterates through a set of blocks in the deduplication domain 130 (step 210). For each data block that is part of the iteration scheme, deduplication server 110 computes the digest with the help of IO Coordinator 155 and file system mapping driver 165 (step 215). Deduplication server 110 returns the digest information to the deduplication daemon (step 220). If the requested number of blocks under the selected iteration scheme have not been digested yet and the iteration has not reached the end of the deduplication domain, the deduplication server 110 iterates to the next block of the deduplication domain as specified in the selected iteration scheme. Otherwise, the deduplication server completes the request by returning an array of all the digests. Deduplication daemon 105 then processes the digest information (step 225) and issues a new request for the next set of data blocks. This process repeats until the entire set of blocks in a deduplication domain 70 has been iterated through according to the selected iteration scheme. Deduplication daemon 105 also evaluates various factors 120 to dynamically change the iteration scheme in order to heuristically determine a highly effective or optimal method of iteration to be used to increase the deduplication efficiency (step 230). The factors may be used to help improve the deduplication efficiency and/or to help manage the deduplication process. Deduplication daemon 105 may look at prior history or statistics associated with the deduplication process, and upon finding that a particular iteration scheme is not yielding a high number of duplicate blocks, may select another (e.g., next best) scheme that might yield better deduplication.

Figure 7:
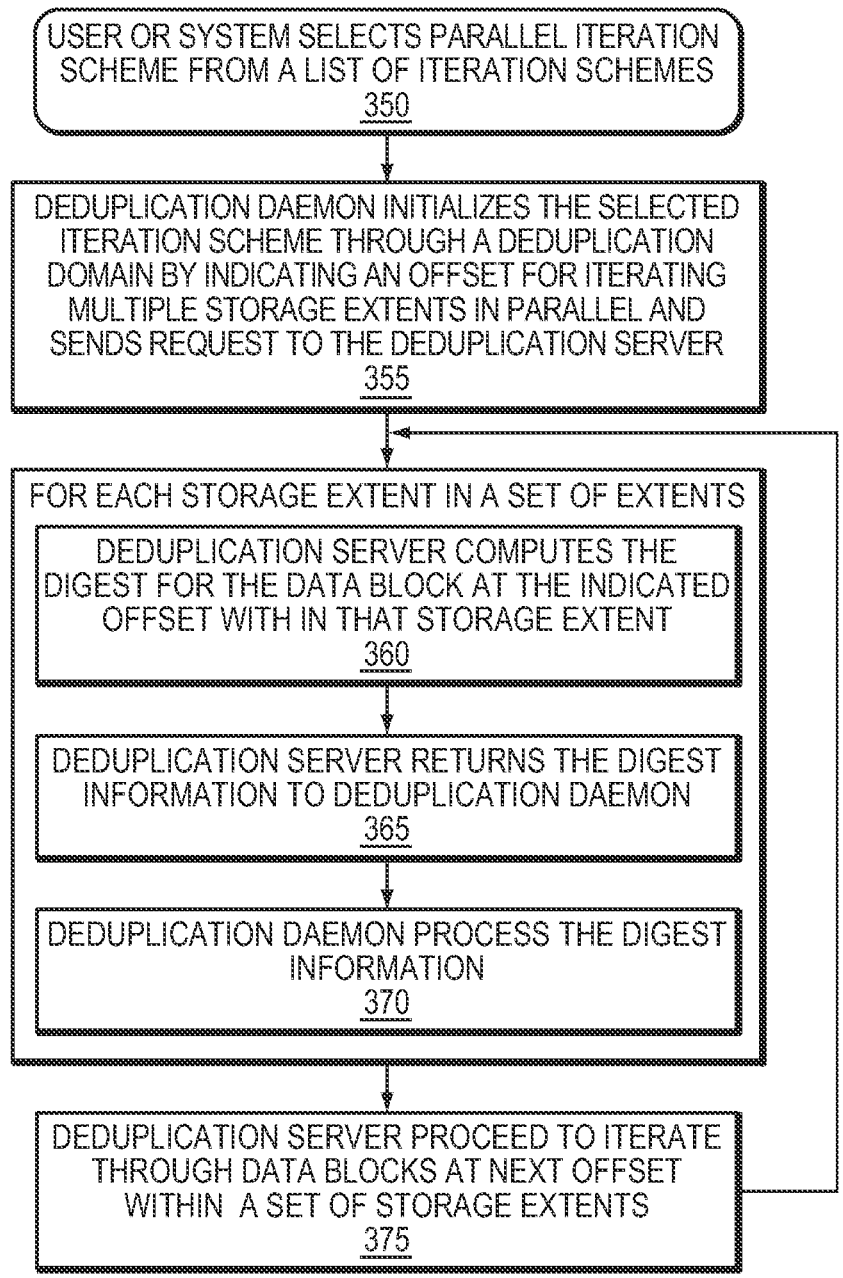

Referring to FIG. 7, shown is a flow diagram illustrating the method of iterating for deduplication in the data storage system. A user or a system selects a parallel iteration scheme from a list of iteration schemes 115 (step 350). The selected iteration scheme is supplied to the deduplication daemon 105 that does the initialization for iterating through a deduplication domain 130 and sends the request to the deduplication server 110 (step 355). An offset is determined for selecting a collection of data blocks from multiple storage extents. Deduplication server 110 computes the digest of a data block located at the determined offset within a storage extent with the help of IO Coordinator 155 and file system mapping driver 165 (step 360). Deduplication server 110 returns the digest information to the deduplication daemon 105 (step 365). Deduplication daemon 105 processes the digest information (step 370). This process of computing digest is repeated for each data block at the determined offset within each storage extent in a set of storage extents belonging to the deduplication domain 130. Deduplication server 110 proceeds to iterate through a set of data blocks located at the next offset within the set of storage extents in a deduplication domain 130 (step 375). This process repeats until every data block in the set of storage extents in deduplication domain 130 has been iterated through according to the iteration scheme.

Figure 8:
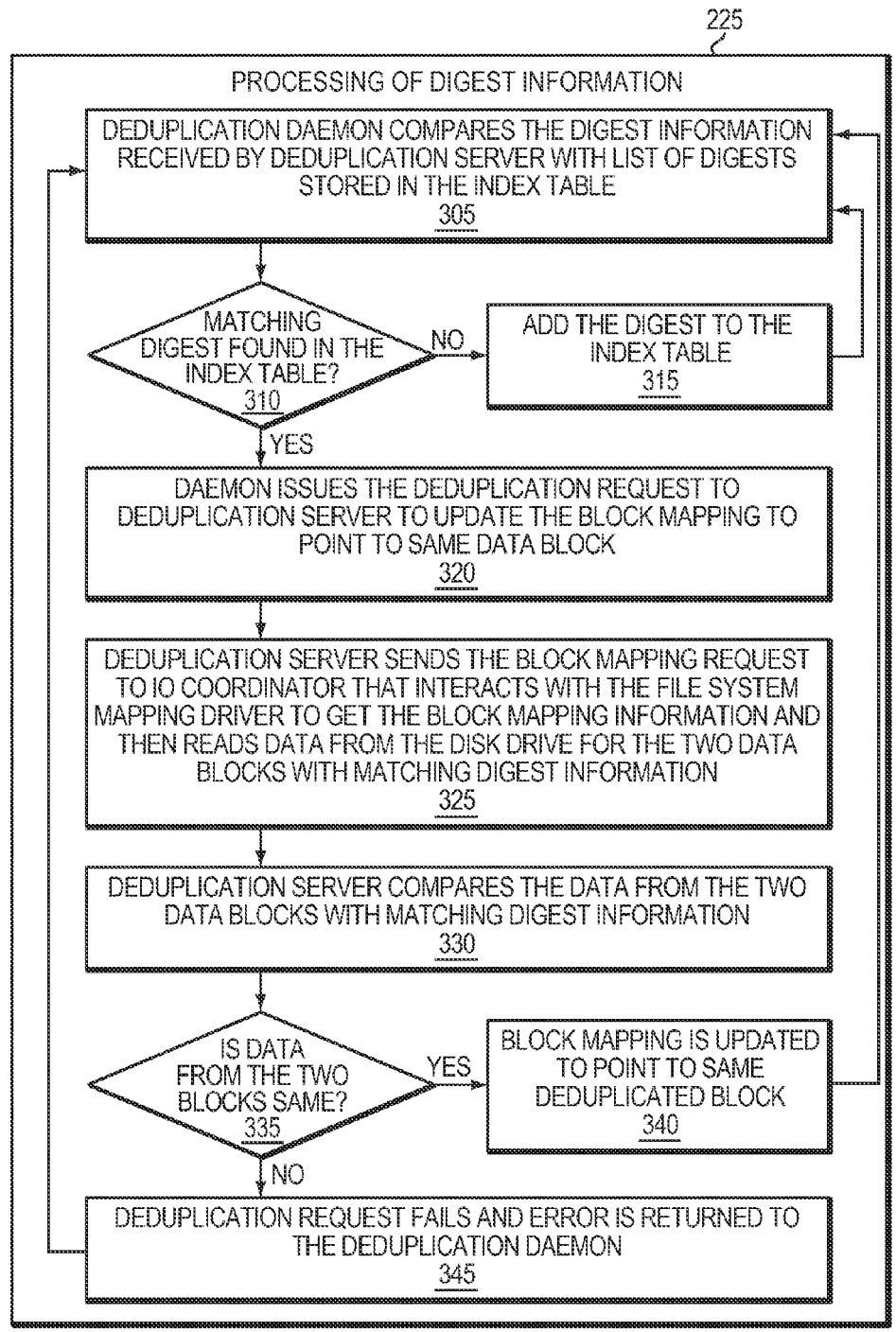

Referring now to FIG. 8 that illustrates a process of deduplicating two data blocks that have been identified by deduplication daemon 105 as duplicate data blocks during processing of a digest information. Deduplication daemon 105 compares the digest information of a first data block received from the deduplication server 110 with the list of digests stored in the index table (step 305). A matching digest found in the index table indicates that the first data block contains exact same data as data stored in a second data block corresponding to the matching digest (step 310). Deduplication daemon 105 issues a request to the deduplication server 110 to deduplicate the first data block and the second data block (step 320). Deduplication server 110 extracts filesystem information from the digest information of the first data block. Deduplication server 110 issues an IO request to the IO Coordinator 155 through Mapped LUN driver 160 (step 325). The IO Coordinator 155 issues a mapping request to the file system mapping driver 165 to find physical address of the first data block. If the mapping request completes successfully, the IO Coordinator 155 reads the data from the first data block located at the physical address indicated by the mapping. The deduplication server 110 issues a read request for the second data block. The read request for the second data block is processed identically to the first read request (step 330). When the second read request completes, deduplication server 110 compares the data read from the first data block with the data read from the second data block (step 335). If the data of the first data block is not same as the data of the second data block, the request to deduplicate the data blocks fails and an error is returned back to the deduplication daemon 105 (step 345). If the data of the first data block is same as the data of the second data block, the IO Coordinator 155 requests file system mapping driver 165 to deduplicate the two identical data blocks (step 340). If the data blocks are successfully deduplicated, the address mapping of the first data block is updated to point to a single copy of the data (i.e. the address map of the first data block now points to the address map of the second data block) (step 340). If the data blocks are not successfully deduplicated, an error is returned back to the deduplication daemon 105 to update its index table accordingly (step 345).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in iterating for deduplication, the method comprising:
    selecting a collection of data from a set of storage extents, wherein the collection of data comprises respective subset of the contents of each storage extent of the set of storage extents, wherein respective subset of the contents of each storage extent is selected based on a respective offset, wherein the respective offset indicates a location of the respective subset within a storage extent; and
    applying a deduplicating technique to the collection of data, wherein the deduplicating technique is applied in parallel to respective subset of the contents of each storage extent.

2. The method of claim 1, wherein selecting a collection of data from a set of storage extents further comprising:
    a) determining a respective offset;
    b) based on the determined respective offset, selecting a subset of the contents of a storage extent of the set of storage extents, wherein the subset of the contents of the storage extent resides at the said determined respective offset within the storage extent; and
    repeating steps a-b until the collection of data is selected from each storage extent of the set of storage extents.

3. The method of claim 2, further comprising:
    a) changing the determined respective offset to another offset to select another collection of data from a set of storage extents;
    b) based on the other offset, selecting another subset of the contents of a storage extent of the set of storage extents, wherein the other subset of the contents of the storage extent resides at the other offset within the storage extent; and
    repeating steps a-b until the other collection of data is selected from each storage extent of the set of storage extents.

4. The method of claim 1, wherein a deduplication domain comprises a set of storage extents, wherein each storage extent of the set of storage extents comprises a set of LUNs, each LUN of the set of LUNs is a logical representation of a subset of a physical disk storage.

5. The method of claim 1, wherein a collection of data comprises a collection of data blocks, wherein the data block is a fixed size chunk of a physical disk storage.

6. The method of claim 1, wherein a digest is associated with a data block, wherein the digest is based on contents of the data block and uniquely identifies the data block.

7. The method of claim 1, wherein an index table comprises a set of index entries, wherein each index entry of the set of index entries is associated with a digest of a data block.

8. The method of claim 1, further comprising:
    computing a digest for each data of the collection of data; and processing the digest for each data of the collection of data for applying a deduplicating technique to the collection of data.

9. The method of claim 8, wherein the processing of digest further comprising:
comparing the digest with one or more index entries of the index table;
determining, based on whether the digest matches with an index entry of the index table, whether to apply a deduplicating technique to the data block;
based on the determination, comparing contents of a data block associated with the digest with contents of a data block associated with the matching index entry; and
based on the comparison, applying the deduplicating technique to the data block associated with the digest and the data block associated with the matching index entry.

10. The method of claim 9, further comprising:
based on whether the digest matches with an index entry of the index table, adding an index entry to the index table, wherein the index entry is associated with the digest.

11. The method of claim 1, wherein applying the deduplicating technique further comprising:
updating an address mapping of a first data block to point to a second data block, wherein the first data block and the second data block contain same content of data, wherein the address mapping indicates a location of a data block on a disk storage; and
deleting the content of the first data block from the disk storage.

12. A system for use in iterating for deduplication, the system comprising:
a processor configured with:
first logic selecting a collection of data from a set of storage extents, wherein the collection of data comprises respective subset of the contents of each storage extent of the set of storage extents, wherein a respective subset of the contents of each storage extent is selected based on respective offset, wherein the respective offset indicates a location of the respective subset within a storage extent; and
second logic applying a deduplicating technique to the collection of data, wherein the deduplicating technique is applied in parallel to respective subset of the contents of each storage extent.

13. The system of claim 12, wherein selecting a collection of data from a set of storage extents further comprising:
a) third logic determining a respective offset;
b) fourth logic selecting, based on the determined respective offset, a subset of the contents of a storage extent of the set of storage extents, wherein the subset of the contents of the storage extent resides at the said determined respective offset within the storage extent; and
repeating logic a) and b) until the collection of data is selected from each storage extent of the set of storage extents.

14. The system of claim 12, wherein a deduplication domain comprises a set of storage extents, wherein each storage extent of the set of storage extents comprises a set of LUNs, each LUN of the set of LUNs is a logical representation of a subset of a physical disk storage.

15. The system of claim 12, wherein a collection of data comprises a collection of data blocks, wherein the data block is a fixed size chunk of a physical disk storage.

16. The system of claim 12, wherein a digest is associated with a data block, wherein the digest is based on contents of the data block and uniquely identifies the data block.

17. The system of claim 12, wherein an index table comprises a set of index entries, wherein each index entry of the set of index entries is associated with a digest of a data block.

* * * * *